(12) United States Patent
Urano et al.

(10) Patent No.: US 10,766,460 B2
(45) Date of Patent: Sep. 8, 2020

(54) OPERATION OF VEHICLE WINDOW WIPERS BASED ON PERCEIVED VEHICLE STOPS TO DROP OFF PASSENGERS

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 126 days.

(21) Appl. No.: 16/188,925

(22) Filed: Nov. 13, 2018

(65) Prior Publication Data

US 2020/0148170 A1    May 14, 2020

(51) Int. Cl.
*B60S 1/08* (2006.01)
*G06T 7/00* (2017.01)
*G06T 7/20* (2017.01)

(52) U.S. Cl.
CPC .......... *B60S 1/0822* (2013.01); *G06T 7/0008* (2013.01); *G06T 7/20* (2013.01); *G06T 2207/30196* (2013.01); *G06T 2207/30268* (2013.01)

(58) Field of Classification Search
CPC ................. B60S 1/0862; B60S 1/0896; G05D 2201/0212; B60W 2040/0881
See application file for complete search history.

(56) References Cited

U.S. PATENT DOCUMENTS

| | | | |
|---|---|---|---|
| 4,554,493 A | 11/1985 | Armstrong | |
| 7,202,776 B2 | 4/2007 | Breed | |
| 8,457,827 B1 | 6/2013 | Ferguson | |
| 8,825,258 B2 | 9/2014 | Cullinane | |
| 8,849,494 B1 | 9/2014 | Herbach | |
| 8,880,270 B1 | 11/2014 | Ferguson | |
| 9,587,952 B1 | 3/2017 | Slusar | |
| 9,821,818 B2 * | 11/2017 | Cullinane | ............ G05D 1/0061 |
| 9,969,396 B2 | 5/2018 | Damman | |
| 2014/0236414 A1 | 8/2014 | Droz | |

(Continued)

FOREIGN PATENT DOCUMENTS

| | | |
|---|---|---|
| DE | 102012021282 | 4/2014 |
| DE | 102015110903 | 1/2016 |
| DE | 102015224033 | 3/2017 |

*Primary Examiner* — Kenneth J Malkowski
(74) *Attorney, Agent, or Firm* — Sheppard, Mullin, Richter & Hampton LLP; Hector A. Ageppa; Daniel N. Yannuzzi

(57) ABSTRACT

Systems, methods, and storage media for controlling wiper devices of a vehicle are disclosed. Exemplary implementations may: remove, by one or more wiper devices, fluid or debris from viewing portals; generate output signals conveying passenger sensor information related to passenger actions; generate output signals conveying vehicle sensor information related to vehicle operations; determine, based on the output signal, the passenger sensor information; determine, based on the output signal, the vehicle sensor information; assess, based on the passenger sensor information or the vehicle sensor information, readiness of a passenger to depart the vehicle via an exit; and control, based on the readiness of the passenger to depart the vehicle via the exit, the one or more wiper devices.

20 Claims, 5 Drawing Sheets

(56) References Cited

U.S. PATENT DOCUMENTS

| | | |
|---|---|---|
| 2015/0066293 A1* | 3/2015 | Davies ................. G06K 9/2018 |
| | | 701/36 |
| 2015/0149017 A1 | 5/2015 | Attard |
| 2015/0203107 A1 | 7/2015 | Lippman |
| 2015/0339928 A1 | 11/2015 | Ramanujam |
| 2016/0026182 A1 | 1/2016 | Boroditsky |
| 2016/0229378 A1* | 8/2016 | Kowalk .................... B60S 1/68 |
| 2017/0192437 A1 | 7/2017 | Bier |
| 2018/0039917 A1 | 2/2018 | Buttolo |

* cited by examiner

OPERATION OF VEHICLE WINDOW WIPERS BASED ON PERCEIVED VEHICLE STOPS TO DROP OFF PASSENGERS

TECHNICAL FIELD

The present disclosure relates to controlling wiper devices of a vehicle based on detection of perceived passenger readiness to depart.

BACKGROUND

Autonomous vehicles are becoming more common, and particularly in the on-demand transportation industry. Typically, window wipers are controlled to clear fluid and/or debris from vehicle windows based on direct control by a driver, and/or based on detected presence of such fluid and/or water.

BRIEF SUMMARY OF EMBODIMENTS

One aspect of the present disclosure relates to controlling wiper devices of an autonomously operated vehicle to accommodate passenger exits. The system may include one or more hardware processors configured by machine-readable instructions. The wiper device(s) may be configured to remove, by one or more wiper devices, fluid or debris from viewing portals. The wiper device(s) may work concurrently with disbursed washer fluid. The passenger sensor(s) may be configured to generate output signals conveying passenger sensor information related to passenger actions. The vehicle sensor(s) may be configured to generate output signals conveying vehicle sensor information related to vehicle operations. The passenger information determination component may be configured to determine, based on the output signal, the passenger sensor information. The vehicle information determination component may be configured to determine, based on the output signal, the vehicle sensor information. The readiness assessment component may be configured to assess, based on the passenger sensor information or the vehicle sensor information, readiness of a passenger to depart the vehicle via an exit. The wiper device controlling component may be configured to control, based on the readiness of the passenger to depart the vehicle via the exit, the one or more wiper devices and washer fluid disbursement.

As used herein, the term "determine" (and derivatives thereof) may include measure, calculate, compute, estimate, approximate, generate, and/or otherwise derive, and/or any combination thereof.

Another aspect of the present disclosure relates to a method for controlling wiper devices of an autonomously operated vehicle to accommodate passenger exits. The method may include removing, by one or more wiper devices, fluid or debris from viewing portals. The wiper device(s) may work concurrently with disbursed washer fluid. The method may include generating output signals conveying passenger sensor information related to passenger actions. The method may include generating output signals conveying vehicle sensor information related to vehicle operations. The method may include determining, based on the output signal, the passenger sensor information. The method may include determining, based on the output signal, the vehicle sensor information. The method may include assessing, based on the passenger sensor information or the vehicle sensor information, readiness of a passenger to depart the vehicle via an exit. The method may include controlling, based on the readiness of the passenger to depart the vehicle via the exit, the one or more wiper devices and washer fluid disbursement.

Yet another aspect of the present disclosure relates to a non-transient computer-readable storage medium having instructions embodied thereon, the instructions being executable by one or more processors to perform a method for controlling wiper devices of a vehicle. The method may include removing, by one or more wiper devices, fluid or debris from viewing portals. The wiper device(s) may work concurrently with disbursed washer fluid. The method may include generating output signals conveying passenger sensor information related to passenger actions. The method may include generating output signals conveying vehicle sensor information related to vehicle operations. The method may include determining, based on the output signal, the passenger sensor information. The method may include determining, based on the output signal, the vehicle sensor information. The method may include assessing, based on the passenger sensor information or the vehicle sensor information, readiness of a passenger to depart the vehicle via an exit. The method may include controlling, based on the readiness of the passenger to depart the vehicle via the exit, the one or more wiper devices and washer fluid disbursement.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Vehicles capable of driving in level 4 and level 5 autonomy may be utilized in the on-demand transportation industry in addition to personal ownership. In scenarios where the vehicle is driven with little to no need of human driver supervision, wiper devices may not be utilized as visibility is not necessary for the vehicle to operate. When transported passengers desire to exit the vehicle, visibility through the viewing portals may be low and in need of removal of obstructions.

Autonomous vehicles may be classified into six different levels of autonomy. Level 0 indicates no automation, wherein a human driver must control steering, braking, accelerating, and determine traffic. Level 1 indicates driver assistance, wherein the vehicle may control either steering or speed, not both concurrently. The human driver is responsible for correcting and/or taking over if the driver assistance acts incorrectly. Level 2 indicates partial automation, wherein the vehicle may coordinate two or more driver assistance systems, such as adaptive cruise control and lane-keep assist. The human driver is responsible for calculated maneuvers, such as obeying traffic signals, and must still be vigilant in noticing potential dangers. Level 3 indicates conditional automation, wherein the vehicle can control steering, braking, and accelerating in most situations. The human driver must be alert and available to intervene when the vehicle indicates it cannot handle a situation. Level 4 indicates high automation, wherein the vehicle can operate with little to no human oversight or intervention under strict conditions, such as certain geographical areas or road types. Level 5 indicates full automation, wherein the vehicle can operate in any condition on any road a human can. The only involvement required at this level is entering an end destination.

Figure 1:
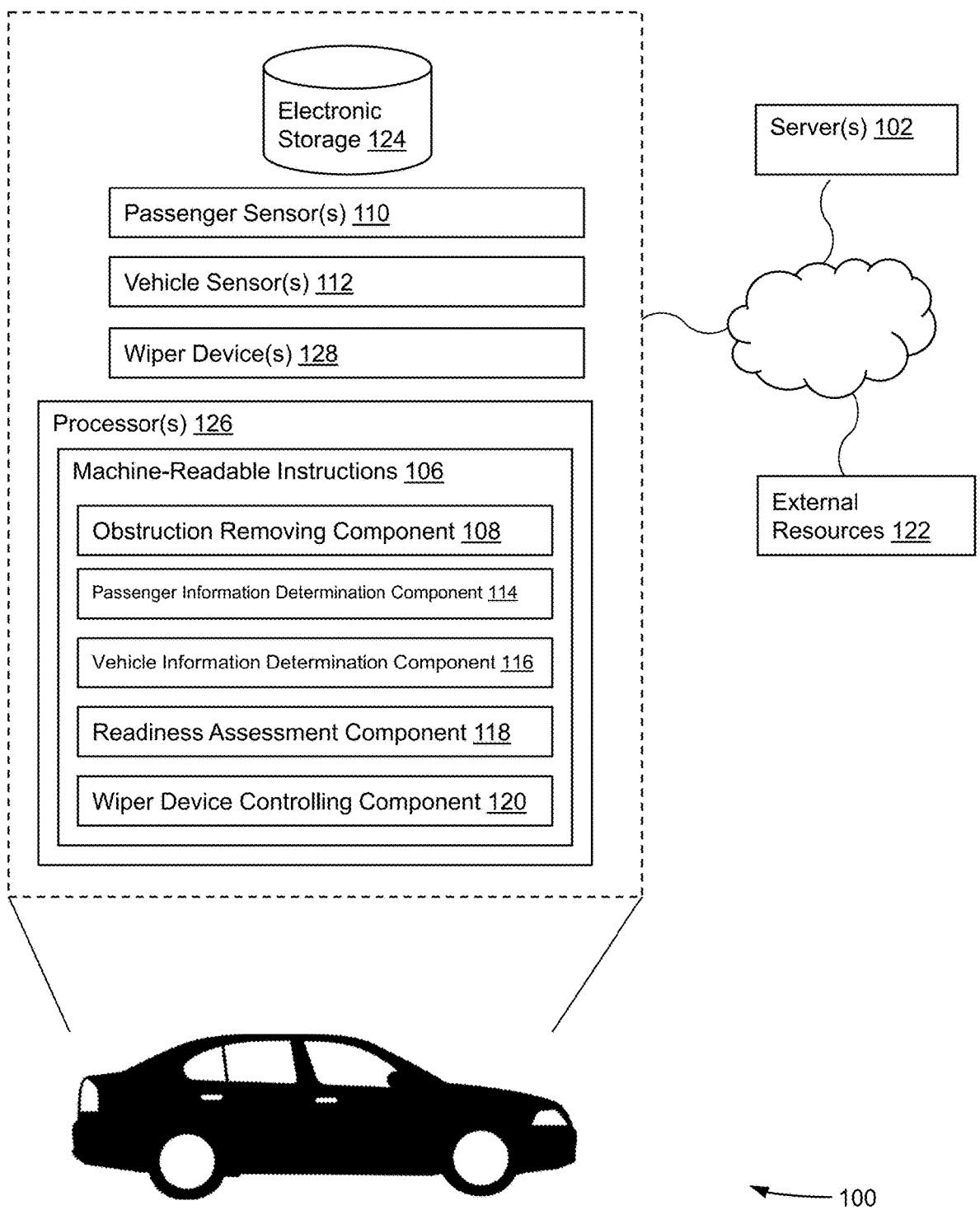
FIG. 1 illustrates a system configured for controlling wiper devices of a vehicle, in accordance with one or more implementations.

FIG. 1 illustrates a vehicle 100 configured for controlling wiper devices of a vehicle, in accordance with one or more implementations. In some implementations, vehicle 100 may include one or more servers 102.

Vehicle(s) 100 may be configured by machine-readable instructions 106. Vehicle 100 may include passenger sensor(s) 110, vehicle sensor(s) 112, and wiper device(s) 128. Machine-readable instructions 106 may include one or more instruction components. The instruction components may include computer program components. The instruction components may include one or more of an obstruction removing component 108, a passenger information determination component 114, a vehicle information determination component 116, a readiness assessment component 118, a wiper device controlling component 120, and/or other instruction components. In some or all limitation, machine-readable instructions 106 may be performed by server(s) 102.

Obstruction removing component 108 may be configured to remove, by wiper device(s) 128, fluid or debris from viewing portals. Obstruction removing component 108 may also be configured to concurrently disburse washer fluid. Fluid may include rain, snow, hail, and other fluids. Debris may include dirt, dust, sand, pollen, and others. Wiper devices may include windshield wipers, rear window wipers, and others. Viewing portals may include one or more of wind shields, rear windows, sunroofs, and side windows. Washer fluid may include water, a soap mixture, and/or other cleaning liquids.

Passenger sensor(s) 110 may be configured to generate output signals conveying passenger sensor information related to passenger actions. Passenger actions may include movement and/or voiced activity executed by a passenger.

Passenger sensor(s) 110 may include image sensors, cameras, and/or other sensors. As used herein, the terms "camera", "image sensor", and/or "passenger sensor" may include any device that captures images, including but not limited to a single lens-based camera, a camera array, a solid-state camera, a mechanical camera, a digital camera, an image sensor, a depth sensor, a remote sensor, a weight sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, weight information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

Vehicle sensor(s) 112 may be configured to generate output signals conveying vehicle sensor information related to vehicle operations. Vehicle operations may include maneuvers and activities the vehicle was instructed to execute and/or current operations of the vehicle.

Vehicle sensor(s) 112 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "vehicle sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100.

Passenger information determination component 114 may be configured to determine, based on the output signal, whether the passenger sensor information indicates departure detection trigger events.

Vehicle information determination component 116 may be configured to determine, based on the output signal, the vehicle sensor information regarding vehicle operations.

In some implementations, by way of non-limiting example, the departure detection trigger events may include passenger actions. Passenger actions may include disengagement of a seat belt, continuously looking out the window, phrases vocally conveyed by the passenger, e.g., "I'll get off here", "It's coming up", and/or a change in physical state of the passenger, e.g. uncrossing legs, sitting up straight, leaning over to gather belongings. In some implementations, by way of non-limiting example, the departure detection trigger events may include vehicle operations. Vehicle operations may include determining relative location of a present lane with respect to one or more other lanes or the road as a whole, a decrease of the vehicle's overall speed, increased use of turn signals or hazard lights. In some implementations, the distance to a destination may be less than a threshold away. A destination may be known, inferred, entered, or other. In addition implementations, departure detection trigger events may include unlocking the exit(s), putting a hand on the exit handle, pressing a button meant to indicate passenger readiness to depart, and/or determining motion external to the vehicle, e.g., passing pedestrians, bicyclists, and/or other vehicles.

Readiness assessment component 118 may be configured to assess, based on the passenger sensor information and/or the vehicle sensor information, the readiness of a passenger to depart the vehicle via an exit. Readiness may be an increased likelihood the passenger will depart the vehicle. Assessing the readiness of the passenger to depart the vehicle via the exit may include detecting one or more departure detection trigger events that are indicative of an increase in the readiness of the passenger to depart the vehicle via the exit. Assessing the readiness of the passenger to depart the vehicle may include determining, in an ongoing manner, a value of a metric that indicates the readiness of the passenger to depart the vehicle. A departure detection trigger event may be detected through analysis of a time derivative of the value of the metric. The departure detection trigger event may be detected through comparison of the value of the metric to a threshold value. The threshold value may change overtime. The threshold value may be static. The threshold value may include a proximity to a destination, current speed, a number of departure detection trigger event occurrences, and other threshold values.

Wiper device controlling component 120 may be configured to control wiper device(s) 128 based on the readiness of the passenger to depart the vehicle via the exit. Wiper device controlling component 120 may control wiper device(s) 128 to commence or accelerate removal of dirt or debris from the one or more viewing portals to enhance visibility through the viewing portals for an anticipated exit of the passenger from the vehicle. In some implementations, the vehicle may include one or more additional exits.

In a non-limiting example embodiment, the threshold value that enables controlling wiper device(s) 128 may be the detection of four or more departure detection trigger events in less than seven minutes. Within five minutes, the vehicle operations and passenger's actions may include the vehicle changing its position to be in the far right lane, the passenger continuously looking out a window, unbuckle his seatbelt, and put his hand on the door. These four detected departure detection trigger events meet the threshold indicating the vehicle is approaching the destination and the passenger is ready to depart. Wiper device(s) 128 are, therefore, controlled to remove obstructions on the vehicle viewing portals.

In a non-limiting example embodiment, the threshold value that enables controlling wiper device(s) 128 may be a numeric value representing a combination of departure detection trigger events that have occurred. Furthermore, departure detection trigger events may correspond to numeric levels of readiness, i.e., low numerals representing passenger less likely to be ready to depart and high numerals representing passenger most likely will depart. A change in a passenger's physical state may be assigned a low numeral, continuously looking out the window may be assigned a higher numeral, and unlocking an exit may be assigned the highest numeral. If the passenger consistently keeps changing their physical state, the threshold value may take longer to meet. If the passenger unlocks an exit in addition to continuously looking out the window, the threshold may be met and wiper device(s) 128 may be controlled.

In a non-limiting example embodiment, the threshold value that enables controlling wiper device(s) 128 may be a remaining distance in feet to the destination. If the vehicle sensor information includes that the remaining distance is less than a threshold value, e.g., 500 feet, the wiper device(s) 128 may be controlled.

Upon determination, based on vehicle sensor(s) 112, one or more exits have opened and closed, indicating one or more passengers has departed the vehicle, the wiper devices may be deactivated and/or reset for a new set of passengers.

In some implementations, server(s) 102, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, and/or external resources 122 may be operatively linked via some other communication media.

External resources 122 may include sources of information outside of vehicle(s) 100, external entities participating with vehicle(s) 100, and/or other resources. In some implementations, some or all of the functionality attributed herein to external resources 122 may be provided by resources included in vehicle(s) 100. External resources 122 may include other sensors such that the output signals conveyed may be useful in determining activation of the wiper device(s).

Vehicle(s) 100 may include electronic storage 124, one or more processors 126, and/or other components. Vehicle(s) 100 may include communication lines, or ports to enable the exchange of information with a network and/or other computing platforms. Illustration of vehicle(s) 100 in FIG. 1 is not intended to be limiting. Vehicle(s) 100 may include a plurality of hardware, software, and/or firmware components operating together to provide the functionality attributed herein to vehicle(s) 100.

Electronic storage 124 may comprise non-transitory storage media that electronically stores information. The electronic storage media of electronic storage 124 may include one or both of system storage that is provided integrally (i.e., substantially non-removable) with vehicle(s) 100 and/or removable storage that is removably connectable to vehicle(s) 100 via, for example, a port (e.g., a USB port, a firewire port, etc.) or a drive (e.g., a disk drive, etc.).

Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from vehicle(s) 100 and/or other information that enables vehicle(s) 100 to function as described herein.

Processor(s) 126 may be configured to provide information processing capabilities in vehicle(s) 100. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 114, 116, 118, and/or 120, and/or other components. Processor(s) 126 may be configured to execute components 108, 114, 116, 118, and/or 120, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 114, 116, 118, and/or 120 are illustrated in FIG. 1 as being implemented within a single processing unit, in implementations in which processor(s) 126 includes multiple processing units, one or more of components 108, 114, 116, 118, and/or 120 may be implemented remotely from the other components. The description of the functionality provided by the different components 108, 114, 116, 118, and/or 120 described below is for illustrative purposes, and is not intended to be limiting, as any of components 108, 114, 116, 118, and/or 120 may provide more or less functionality than is described. For example, one or more of components 108, 114, 116, 118, and/or 120 may be eliminated, and some or all of its functionality may be provided by other ones of components 108, 114, 116, 118, and/or 120. As another example, processor(s) 126 may be configured to execute one or more additional components that may perform some or all of the functionality attributed below to one of components 108, 114, 116, 118, and/or 120.

Figure 2:
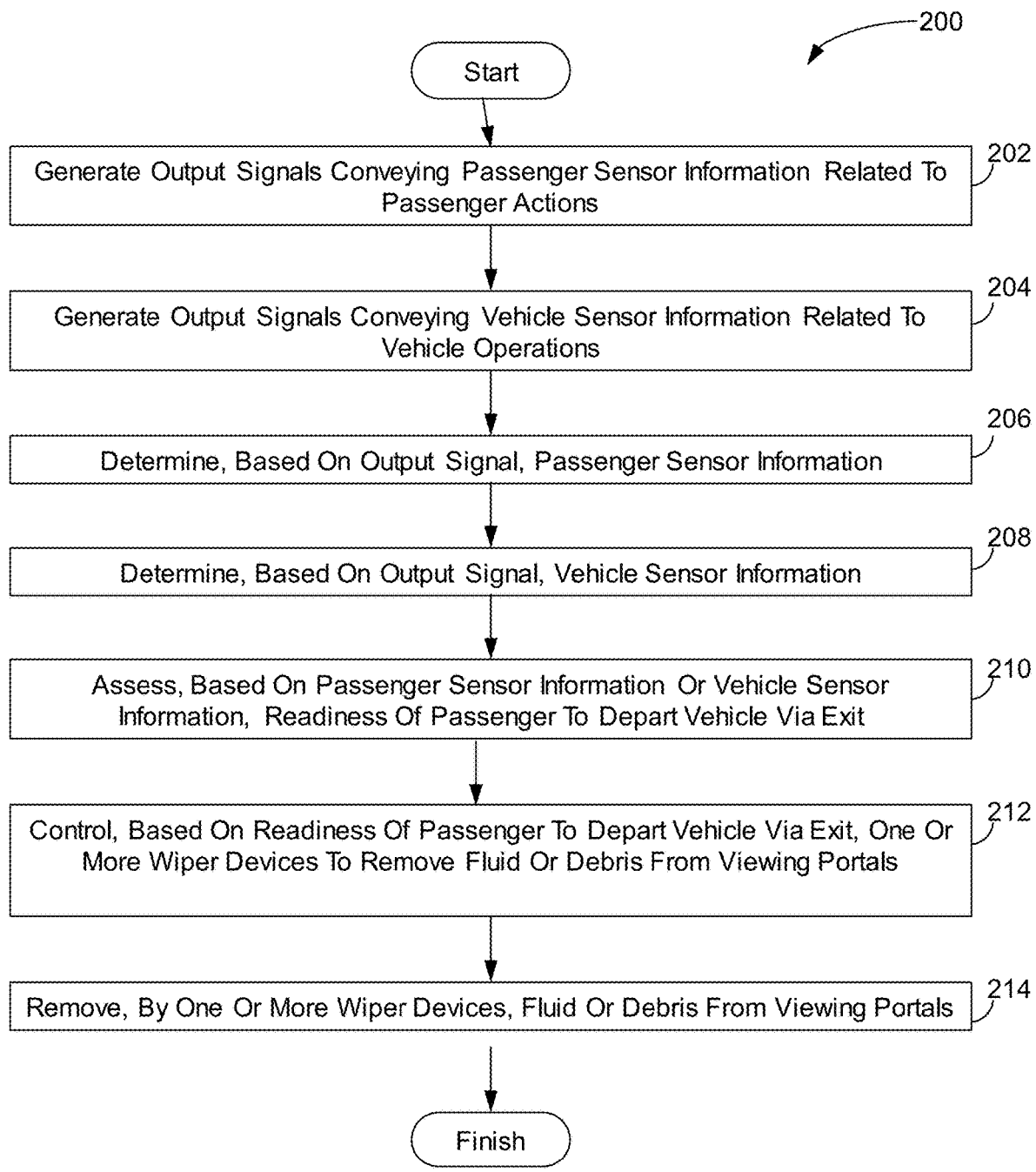
FIG. 2 illustrates a method for controlling wiper devices of a vehicle, in accordance with one or more implementations.

FIG. 2 illustrates a method 200 for controlling wiper devices of a vehicle, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying passenger sensor information related to passenger actions. Operation 202 may be performed by one or more hardware processors configured by machine-readable instructions including a component that is the same as or similar to passenger sensor(s) 110, in accordance with one or more implementations.

An operation 204 may include generating output signals conveying vehicle sensor information related to vehicle operations. Operation 204 may be performed by one or more hardware processors configured by machine-readable instructions including a component that is the same as or similar to vehicle sensor(s) 112, in accordance with one or more implementations.

An operation 206 may include determining, based on the output signal, the passenger sensor information. Operation 206 may be performed by one or more hardware processors configured by machine-readable instructions including a component that is the same as or similar to passenger information determination component 114, in accordance with one or more implementations.

An operation 208 may include determining, based on the output signal, the vehicle sensor information. Operation 208 may be performed by one or more hardware processors configured by machine-readable instructions including a component that is the same as or similar to vehicle information determination component 116, in accordance with one or more implementations.

An operation 210 may include assessing, based on the passenger sensor information or the vehicle sensor information, readiness of a passenger to depart the vehicle via an exit. Operation 210 may be performed by one or more hardware processors configured by machine-readable instructions including a component that is the same as or similar to readiness assessment component 118, in accordance with one or more implementations.

An operation 212 may include controlling, based on the readiness of the passenger to depart the vehicle via the exit, wiper device(s) 128 to remove fluid or debris from the viewing portals. Operation 212 may be performed by one or more hardware processors configured by machine-readable instructions including a component that is the same as or similar to wiper device controlling component 120, in accordance with one or more implementations.

An operation 214 may include removing, by wiper device(s) 128, fluid or debris from viewing portals. Wiper device(s) may work concurrently with washer fluid. Operation 214 may be performed by one or more hardware processors configured by machine-readable instructions including a module that is the same as or similar to fluid debris removing module 108, in accordance with one or more implementations.

Figure 3:
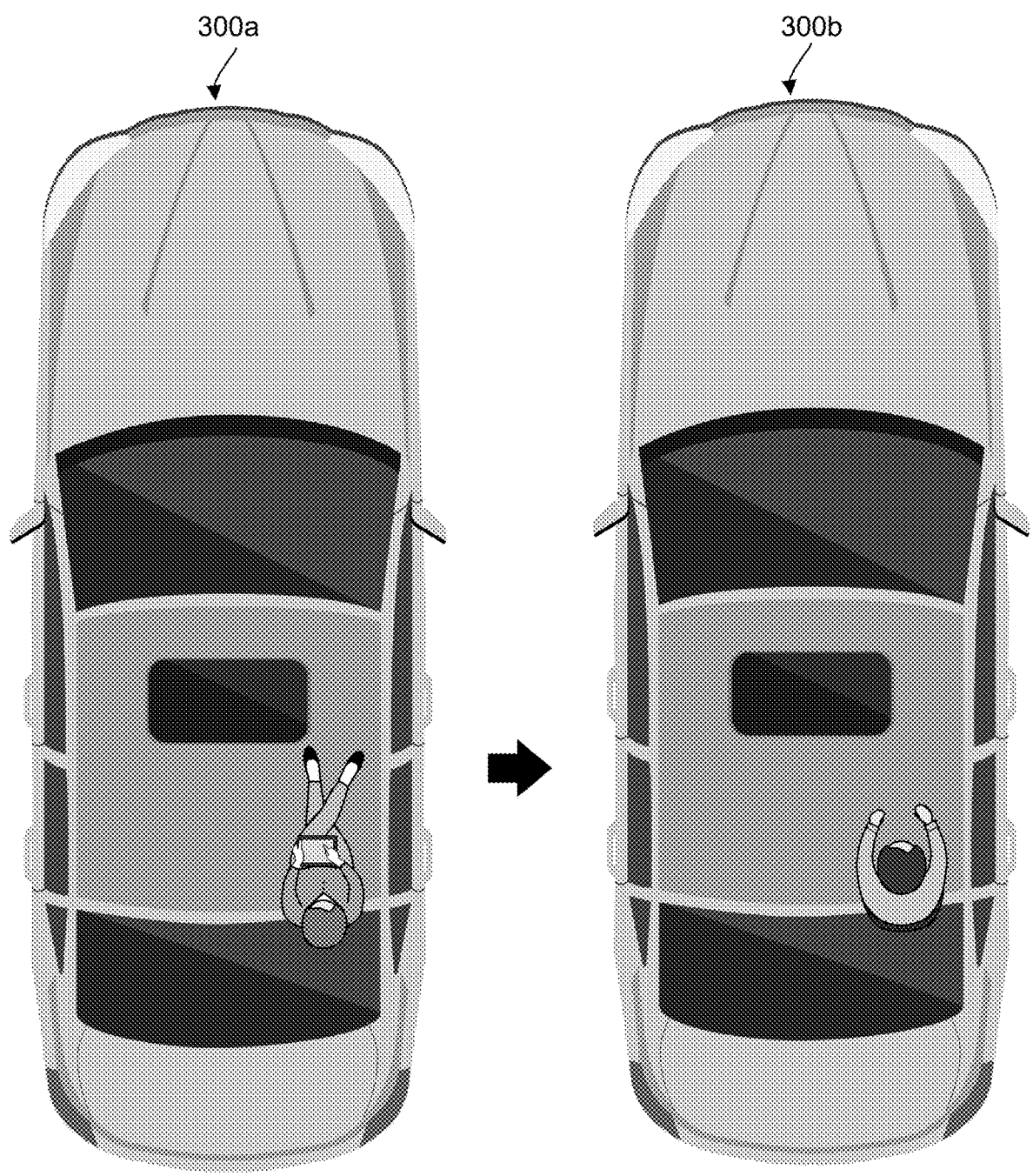
FIG. 3 illustrates an example embodiment of a departure detection trigger event, in accordance with one or more implementations.

FIG. 3 illustrates an example embodiment of a departure detection trigger event. Vehicle 300a illustrates a passenger on a mobile device and not indicating an increased readiness to depart the vehicle. Vehicle 300b illustrates the same passenger in the same vehicle performing a departure detection trigger event, wherein the passenger's pose has changed. The passenger may be putting the mobile device away, an indication of an increased readiness to depart. In this example embodiment, the departure detection trigger event in addition to others, may signal activated of one or more wiper devices.

Figure 4:
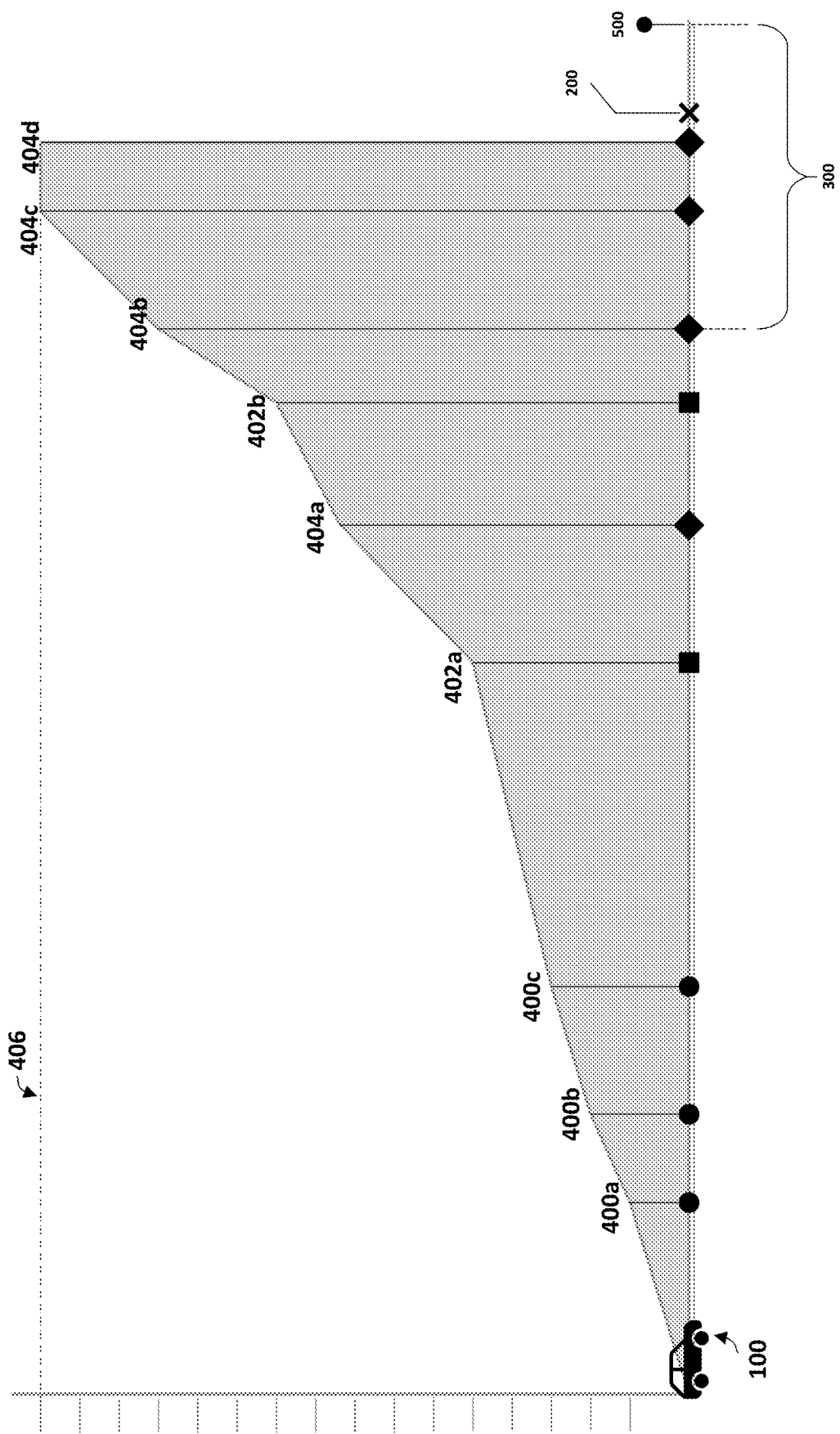
FIG. 4 illustrates an example timeline embodiment of departure detection trigger events, in accordance with one or more implementations.

FIG. 4 illustrates a timeline of a passenger's ride to destination 500 in autonomously driven vehicle 100 configured to control wiper devices. Departure detection trigger events 400a, 400b, and 400c may represent a lower level of the passenger's readiness to depart, e.g., change in pose, change in physical state, wherein threshold 406 may be approached more slowly. Departure detection trigger events 402a and 402b may represent a higher level of the passenger's increased readiness to depart, e.g., putting belongings away, constantly looking through viewing portals, wherein threshold 406 may be approached quicker than events 400a-c. Departure detection trigger event 404a, 404b, 404c, and 404d may represent the highest level of the passenger's readiness to depart, e.g., time period 300, unlocking exits, putting hand on exit handle, vocalization, wherein threshold 406 may be approached quickly and wiper device(s) may be controlled. Time period 300 may be an amount of time remaining until arrival at destination 500. Upon threshold 406 being met, wiper devices may be controlled at time 200.

Figure 5:
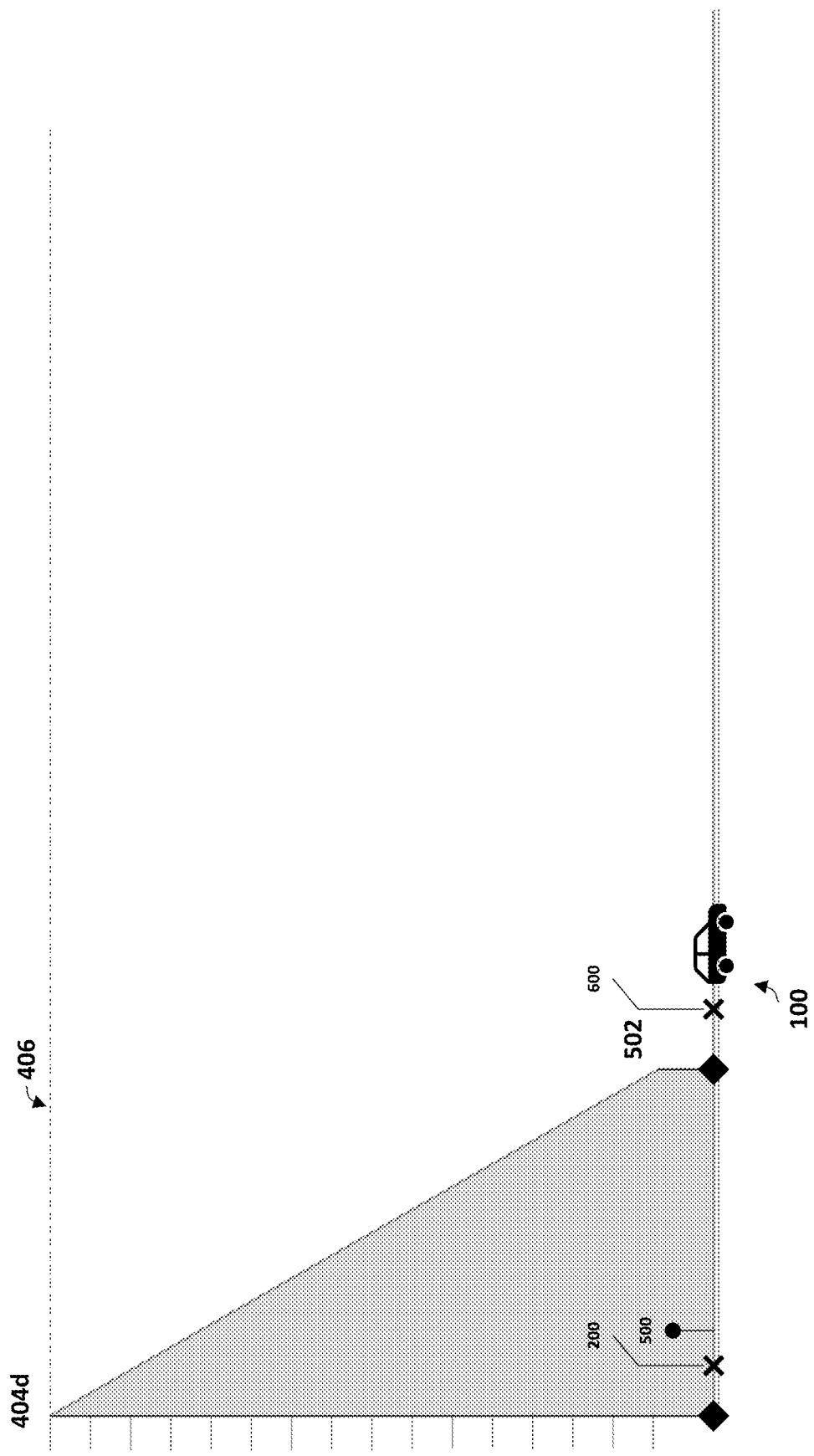
FIG. 5 illustrates an example timeline embodiment of departure detection trigger events, in accordance with one or more implementations.

FIG. 5 illustrates a timeline after a destination has already been reached by autonomously driven vehicle 100. Vehicle 100 controlled the wiper devices at time 200 before reaching destination 500. Departure detection trigger event 404d occurred before destination 500 was approached, wherein 404d may represent a high level of the passenger's increased readiness to depart, e.g. unlocking an exit. Departure detection trigger event 502 may represent the lowest level of a passenger's increased readiness to depart. In this illustration, departure detection trigger event 502 may include no weight sensed in on the seat as conveyed by vehicle sensor(s). Therefore, the wiper device(s) may be deactivated at time 600.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A vehicle configured to control wiper devices, comprising of:
   one or more wiper devices configured to remove fluid and/or debris from viewing portals;
   one or more passenger sensors configured to generate output signals conveying passenger sensor information related to passenger actions;
   one or more vehicle sensors configured to generate output signals conveying vehicle sensor information related to vehicle operations;
   an exit; and
   a processor configured by machine-readable instructions to:
   determine, based on the output signal, the passenger sensor information;
   determine, based on the output signal, the vehicle sensor information;
   assess, based on the passenger sensor information and/or the vehicle sensor information, readiness of a passenger to depart the vehicle via the exit; and
   control, based on the readiness of the passenger to depart the vehicle via the exit, the one or more wiper devices.

2. The system of claim 1, wherein the one or more processors are further configured such that assessing the readiness of the passenger to depart the vehicle via the exit includes detecting one or more departure trigger events that are indicative of an increase in the readiness of the passenger to depart the vehicle via the exit.

3. The system of claim 2, wherein the one or more processors are further configured such that assessing the readiness of the passenger to depart the vehicle includes determining, in an ongoing manner, a value of a metric that indicates the readiness of the passenger to depart the vehicle.

4. The system of claim 3, wherein the one or more processors are further configured such that a departure trigger event is detected through analysis of a time derivative of the value of the metric.

5. The system of claim 3, wherein the one or more processors are further configured such that the departure trigger event is detected through comparison of the value of the metric to a threshold value.

6. The system of claim 5, wherein the one or more processors are further configured such that the threshold value changes over time.

7. The system of claim 5, wherein the one or more processors are further configured such that the threshold value is static.

8. The system of claim 1, wherein the one or more processors are further configured such that controlling the one or more wiper devices based on the readiness of the passenger to depart the vehicle via the exit includes controlling the one or more wiper devices to commence or accelerate removal of dirt and/or debris from the one or more viewing portals to enhance visibility through the viewing portals for an anticipated exit of the passenger from the vehicle.

9. The system of claim 2, wherein the departure detection trigger events include determining one or more of disengagement of a seat belt, phrases vocally conveyed by the passenger, a change in physical state of the passenger, the passenger unlocked the exit, relative location of a present lane with respect to one or more other lanes and/or the road as a whole, a decrease of the vehicle's overall speed, increased use of turn signals and/or hazard lights, and the distance to the destination is less than a threshold away, wherein the vehicle includes one or more additional exits.

10. The system of claim 1, wherein the one or more processors are further configured to control, based on the readiness of the passenger to depart the vehicle via the exit, the one or more wiper devices such that the one or more wipers are deactivated.

11. A method for controlling wiper devices of a vehicle, the method comprising of:
   generating output signals conveying passenger sensor information related to passenger actions;
   generating output signals conveying vehicle sensor information related to vehicle operations;

determining, based on the output signal, the passenger sensor information;

determining, based on the output signal, the vehicle sensor information;

assessing, based on the passenger sensor information and/or the vehicle sensor information, readiness of a passenger to depart the vehicle via an exit;

controlling, based on the readiness of the passenger to depart the vehicle via the exit, the one or more wiper devices; and removing, by one or more wiper devices, fluid and/or debris from viewing portals.

12. The method of claim 11, further comprising:
wherein assessing the readiness of the passenger to depart the vehicle via the exit includes detecting one or more departure trigger events that are indicative of an increase in the readiness of the passenger to depart the vehicle via the exit.

13. The method of claim 12, further comprising:
wherein assessing the readiness of the passenger to depart the vehicle includes determining, in an ongoing manner, a value of a metric that indicates the readiness of the passenger to depart the vehicle.

14. The method of claim 13, further comprising wherein a departure trigger event is detected through analysis of a time derivative of the value of the metric.

15. The method of claim 13, further comprising wherein the departure trigger event is detected through comparison of the value of the metric to a threshold value.

16. The method of claim 15, further comprising wherein the threshold value changes over time.

17. The method of claim 15, further comprising wherein the threshold value is static.

18. The method of claim 11, further comprising:
wherein controlling the one or more wiper devices based on the readiness of the passenger to depart the vehicle via the exit includes controlling the one or more wiper devices to commence or accelerate removal of dirt and/or debris from the one or more viewing portals to enhance visibility through the viewing portals for an anticipated exit of the passenger from the vehicle.

19. The method of claim 12, wherein the departure detection trigger events include determining one or more of disengagement of a seat belt, phrases vocally conveyed by the passenger, a change in physical state of the passenger, the passenger unlocked the exit, relative location of a present lane with respect to one or more other lanes and/or the road as a whole, a decrease of the vehicle's overall speed, increased use of turn signals and/or hazard lights, and the distance to the destination is less than a threshold away, wherein the vehicle includes one or more additional exits.

20. The method of claim 11, further comprising controlling, based on the readiness of the passenger to depart the vehicle via the exit, the one or more wiper devices such that the one or more wipers are deactivated.

* * * * *